Feb. 20, 1945.    R. W. STUART    2,369,811
DRILL MUD LOGGING RECORDING SYSTEM OR THE LIKE
Filed July 3, 1941
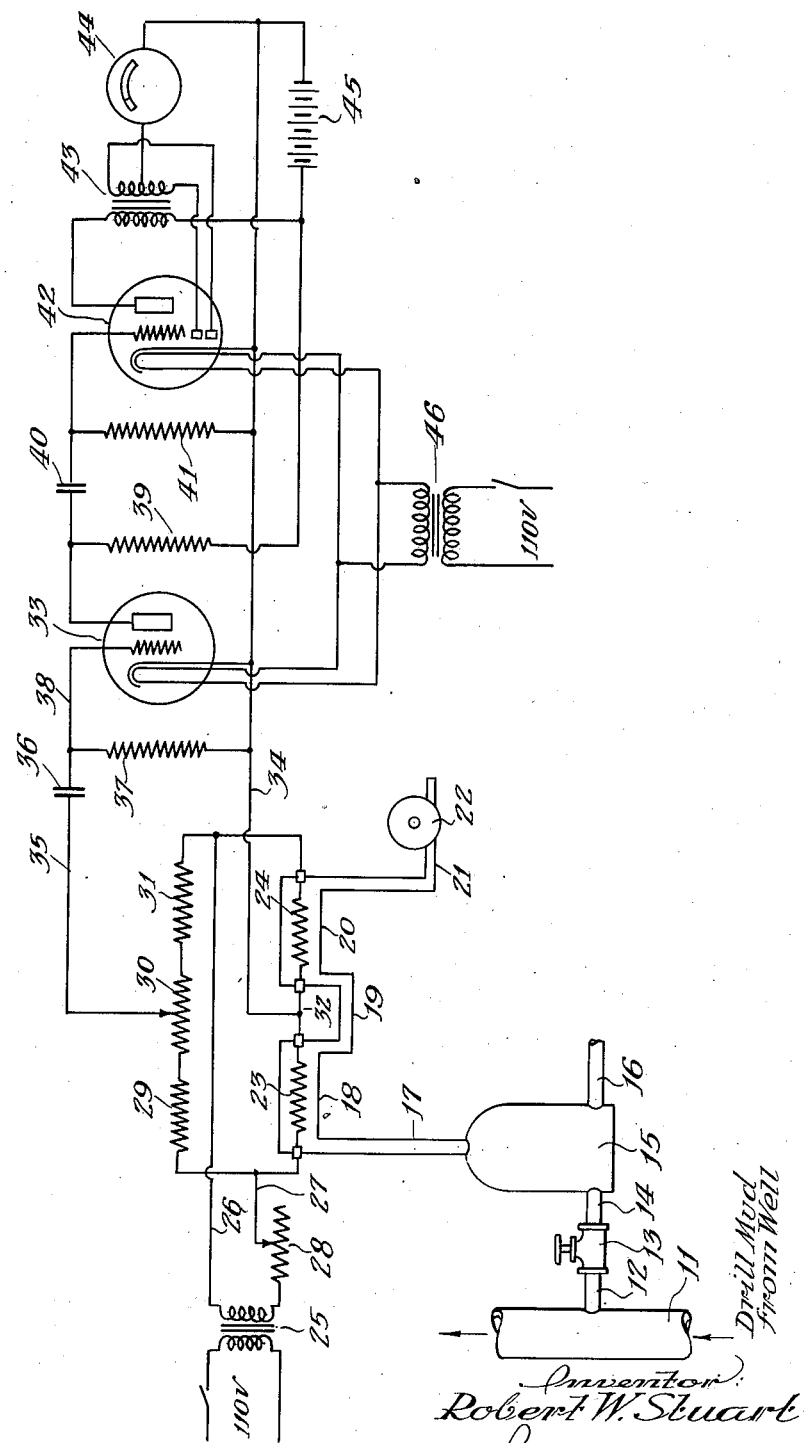
Inventor:
Robert W. Stuart
By Paul F. Hawley.
Patent Agent.

UNITED STATES PATENT OFFICE 2,369,811

DRILL MUD LOGGING RECORDING SYSTEM OR THE LIKE

Robert W. Stuart, Fort Sill, Okla., assignor to Stanolind Oil and Gas Company, Tulsa, Okla., a corporation of Delaware Application July 3, 1941, Serial No. 400,977

1 Claim. (Cl. 23—255)

This invention pertains to the art of the protection against overload of electrical measuring means used to determine the concentration of a substance in a flowing stream, and more particularly as such measuring means are employed in drill mud logging; that is, the ascertaining in drilling fluids used in rotary drilling of the presence of materials indicative of the various formations being penetrated by the drill bit.

It is an object of this invention to provide means, in connection with drill mud logging or the like, for preventing injury to delicate indicating or recording electrical meters due to excessive overload.

It is a further object of this invention to provide a recording equipment in drill mud logging in which the response of the total equipment to the presence of a constituent of the formation being penetrated is approximately logarithmic in character.

It is a further object of this invention to provide a recording circuit in drill mud logging in which the presence of a slight amount of contaminated material from the formation will be indicated or recorded with a maximum sensitivity while the presence of a large amount of this same material will not produce a correspondingly great deflection.

Further objects and advantages of this invention will be recognized upon consideration of this specification.

In previous co-pending applications Serial Numbers 343,734, 347,569, and 347,570, and U. S. Patent 2,289,687, I have described certain methods and means for determining various characteristics of the formations being penetrated by a rotary drill bit which are, in general, characterized by the fact that the presence of such materials in the drilling fluid which circulates through the well, is detected as the fluid returns to the surface by producing certain electrical indications of the presence of, for example, gas, oil, brine, or certain rocks such as lime, anhydrite etc.

Since in general the amount of the concentration on which the investigation is being made in terms of the volume of mud varies between extremely wide limits, and since in general the amount of such material present in the formations may vary also through several orders of magnitude, it is obvious that any detecting system for such contaminants which is sensitive enough to record at the desired lower limits of concentration will be far too sensitive to give a suitable recording of the occasionally found large quantities of the same contaminant. Thus, for example, it has been found by actual test that in numerous wells the presence of a high pressure gas formation can be predicted prior to the penetration of this formation by the bit if the logging equipment used is of a high order of sensitivity. On the other hand, the concentration of the same gases in the drilling fluid as the drilling bit passes through the high pressure formation may be anywhere from 1000 to over 10,000 times as great as the minimum concentration which it is desired to detect. About the same range of concentrations is found in the study of the brine, or of the oil present in the drilling fluid. If the same recording sensitivity is used the deflections will be off the scale of the indicating or recording instrument used and thus no quantitative idea can be obtained of the maximum concentration. At the same time it is obvious that there is great danger of burning out the sensitive recording meters which are used in such logging instruments.

While it is possible to eliminate the above difficulty satisfactorily as to recording such tremendous variations in range by using a series of shunts on the recording equipment to decrease its sensitivity, nevertheless, in practice this is found highly undesirable in that an operator must be constantly at hand to adjust the sensitivity of the instrument to handle the conditions encountered. These metering difficulties have been overcome and equipment developed for indicating or recording with high sensitivity the presence of a low concentration of the material being logged while at the same time making possible the measurement of a high concentration of this same material within the scale range of the meter used. At the same time the need for an operator to supervise constantly the operation of the various indicating and recording devices is eliminated.

I accomplish this result by the utilization of an electron tube circuit interposed between the detector of the material being logged and the recording instrument, which has an inherently non-linear response to the electrical signals produced by the detector in such a manner that the detected or recorded signal is roughly proportional to the logarithm of the amplitude of the detector signal. By the utilization of a circuit of this type slight changes in the concentration of the material being logged when the concentration is low are recorded with a high degree of sensitivity while the recording of high concentrations, in which slight changes are unimportant, is accomplished at a greatly decreased recording sensitivity.

For purposes of illustration, one embodiment of this electron tube circuit is shown in diagrammatic form in the accompanying drawing in which the circuit is shown applied to the detection of combustible gases in the drilling fluid. However, it is to be understood that this same type of circuit can be utilized in the detection or recording of any constituent of the drilling fluid for which electrical detection means have been or may be developed.

In the drawing the drilling fluid which has been circulated to the bottom of the drilling well and which has returned to the surface passes through pipe 11. A side stream is taken off through pipe 12, the flow through which is controlled by valve 13. This mud stream then passes through pipe 14 into separator 15 from which it flows through pipe 16 and is eventually discharged back into the mud pit. Separator 15 is constructed with a dome which is not permitted to fill completely with mud, and may suitably be supplied with baffles so that as the drilling fluid flows through this separator there is an agitation of the fluid with a resultant tendency for the gas present to separate from the mud. This tendency is increased by applying a vacuum to the dome through line 17 which is attached to the upper part of the dome. The flow of air and gas from line 17 passes through a chamber 18, line 19, into a similar chamber 20, then through line 21 into a vacuum pump 22, or the like, from which it is discharged into the atmosphere. A vacuum of a few inches of water is highly satisfactory to produce the desired removal of the gas from the mud. A resistance or heater wire 23 which may suitably be made of number 50 platinum wire is held in place by insulators in chamber 18. A similar resistance 24 is placed in chamber 20. These two wires are connected in series with a suitable source of current which may be supplied from an alternating-current source through a step-down transformer 25 and lines 26 and 27. A rheostat 28 can be included in the circuit to adjust the heating current through the resistances 23 and 24. This rheostat is adjusted so that wire 23 is maintained at a sufficient temperature to burn the combustible gases entering chamber 18 from line 17. Three other resistors 29, 30 and 31 are connected in series across resistances 23 and 24 and form therewith a Wheatstone bridge, the balance point of which may be adjusted by means of a slider on resistance 30.

The combustible constituents of the gas entering chamber 18 through line 17 from separator 15 are burned in chamber 18 on or near the surface of resistance 23 thereby raising the temperature and accordingly the resistance of resistance 23. Since substantially no combustion takes place in chamber 20, the resistance of wire 24 will not be similarly raised. This is aided by the fact that there is in general an extremely minute amount of combustible material drawn off so that the temperature of the gas entering chamber 20 is almost exactly the same as that entering chamber 18. Accordingly the balance of the bridge between point 32 and the slider on resistance 30 is upset in relation to the amount of combustible gases present in the material removed from separator 15. On the other hand, changes in temperature of resistances 23 and 24 due to change in flow rate of the gas is substantially eliminated because the flow over each wire is at the same rate. Since the difference of potential from point 32 to the slider on resistance 30 depends on the unbalance of the bridge and hence on the amount of combustible material present it follows that this potential is an indication of the gas in the drilling mud which can be indicated or recorded. This is accomplished by means of the electron tube circuit the input to which is taken from these two points and the output of which varies approximately logarithmically with the amplitude of the input signal.

The input signal is coupled between the grid and cathode of an amplifying triode 33 by means of lines 34 and 35, condenser 36, grid resistor 37, and line 38. It will be noted that no bias battery or cathode-bias circuit is employed in connection with this triode. The employed signal on the plate of triode 33 is coupled by means of plate resistor 39, coupling condenser 40, and grid resistor 41 between the grid and cathode of a dual diode-high gain triode tube 42. In the circuit associated with this tube there is likewise no grid-bias battery or cathode-bias circuit. The output signal from the plate of this tube is coupled by means of transformer 43 to a full-wave rectifying circuit including the diodes of tube 42. The center tap on the secondary of transformer 43 is connected in series with a recording or indicating meter 44 to the cathode of tube 42. Plate potential for both tubes 33 and 42 is obtained from a battery 45 or other suitable source of potential. The cathodes in tubes 33 and 42 are connected through a step-down transformer 46 to the alternating current source or, if desired, to a battery. The particular coupling circuits shown are not unique; transformer coupling or the like could be used instead of the condenser type shown. The non-linear recording characteristic of this circuit is chiefly dependent upon the fact that a high resistance is placed in series with a cathode and control grid of a triode, preferably one having a high amplification factor. When an alternating potential is applied across this high grid resistance, slight rectification takes place in the grid-cathode circuit and a negative potential appears across the resistance which increases as the signal amplitude increases. This grid bias decreases the amplification of the tube as the signal voltage increases.

Such a circuit can be made to record with substantially a logarithmic character over a range of at least a thousand to one by a suitable choice of amplifying tube and grid resistor. Thus, for example, I have found in the particular circuit shown that a grid resistance of the order of two megohms may be used in resistances 37 and 41 when triode 33 is of the 6L5 type and dual diode-high gain triode 32 is of the 6T7 type. It should be noted in passing that using this circuit the first amplifying section is only slightly logarithmic in action and that the secondary amplifying section produces the major logarithmic amplifying effect. The principle employed is not restricted to the use of the particular values of the resistance given or to the particular type of tubes mentioned. Other types can be used but the particular circuit values given have proved to be somewhat more uniform in operation than the others used. The potential of plate battery 45 can suitably be of the order of 180 volts. By varying this potential it is possible to change the amplification characteristics of this circuit somewhat. I have found by using this circuit in logging drill mud in a number of wells that it is well suited to handle the variations in concentrations of combustible gases or other constituents normally found in these wells. However, I have also employed other circuits employing the same principles and with the proper adjustment of the circuit constants a suitable non-linear recording system can be produced.

It is to be understood that the invention is accordingly not limited to the particular embodiment shown and described but is best defined by the appended claim.

I claim:

In apparatus for the indication of widely varying concentrations of substances in the circulation fluid of rotary drilling equipment indicative of changes in the formations penetrated by said drilling equipment including an electric analyzer for the concentration of such indicative substances and a source of alternating current connected to said analyzer, a triode vacuum tube, a high resistance connected between the grid and cathode of said tube, means for impressing across said high resistance a signal proportional to the output of said electric analyzer, said high resistance and said means constituting the sole connections between the grid and the cathode of said tube, a second high gain vacuum tube containing at least one cathode, grid and plate, a second high resistance connected between said grid and cathode of said second high gain tube, means for impressing the output of said triode vacuum tube across the grid and cathode of said second high gain tube, said second high resistance and said last-mentioned means constituting the sole connections between the grid and cathode of said second high gain tube, a rectifier for rectifying the output signals from said second high gain tube and means for producing a visual indication of the rectified output from said rectifier.

ROBERT W. STUART.